(12) United States Patent
DeDe et al.

(10) Patent No.: US 9,340,295 B2
(45) Date of Patent: May 17, 2016

(54) INLET DUCT SCREEN ASSEMBLY

(71) Applicant: United Technologies Corporation, Hartford, CT (US)

(72) Inventors: Brian C. DeDe, San Diego, CA (US); Jack V. Vitale, San Diego, CA (US); Jeffrey V. Stenberg, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/446,407

(22) Filed: Jul. 30, 2014

(65) Prior Publication Data

US 2014/0332624 A1    Nov. 13, 2014

Related U.S. Application Data

(62) Division of application No. 13/193,673, filed on Jul. 29, 2011, now Pat. No. 8,819,937.

(60) Provisional application No. 61/486,502, filed on May 16, 2011.

(51) Int. Cl.
| | | |
|---|---|---|
| *B64D 33/02* | (2006.01) | |
| *B01D 39/10* | (2006.01) | |
| *B64D 41/00* | (2006.01) | |
| *B26F 3/00* | (2006.01) | |

(52) U.S. Cl.
CPC ............... *B64D 33/02* (2013.01); *B01D 39/10* (2013.01); *B26F 3/004* (2013.01); *B64D 41/00* (2013.01); *B64D 2033/022* (2013.01); *B64D 2033/0213* (2013.01); *B64D 2033/0266* (2013.01); *B64D 2041/002* (2013.01); *Y10T 29/496* (2015.01); *Y10T 29/49798* (2015.01); *Y10T 29/49995* (2015.01); *Y10T 29/49996* (2015.01); *Y10T 83/364* (2015.04)

(58) Field of Classification Search
CPC .................. B64D 33/02; B64D 41/00; B64D 2033/0213; B64D 2033/022; B64D 2033/0266; B64D 2041/002; B01D 39/10; B26F 3/004; Y10T 29/49798; Y10T 29/49996; Y10T 83/364; Y10T 29/49995; Y10T 29/496
See application file for complete search history.

(56) References Cited

U.S. PATENT DOCUMENTS

| | | |
|---|---|---|
| 2,770,009 A | 11/1956 | Rogal et al. |
| 2,814,454 A | 11/1957 | Atkins et al. |
| 2,969,941 A | 1/1961 | Hobart, Jr. |
| 5,587,077 A | 12/1996 | Aaltonen et al. |
| 5,697,394 A | 12/1997 | Smith et al. |
| 6,193,011 B1 | 2/2001 | Harris |
| 6,915,910 B2 | 7/2005 | Lutz et al. |
| 6,959,552 B2 | 11/2005 | Leblanc |

(Continued)

FOREIGN PATENT DOCUMENTS

WO    9316280    8/1993

OTHER PUBLICATIONS

Jun. 12, 2015 French Search Report for French Application No. 1254494.

*Primary Examiner* — John C Hong
(74) *Attorney, Agent, or Firm* — Carlson, Gaskey & Olds, P.C.

(57) ABSTRACT

An example inlet duct screen assembly includes a grid portion including a plurality of apertures and a frame portion circumscribing the grid portion. The grid portion and the frame portion are formed from a single sheet of material.

18 Claims, 3 Drawing Sheets

(56) References Cited

U.S. PATENT DOCUMENTS

| | | |
|---|---|---|
| 7,337,605 B2 | 3/2008 | Hagshenas |
| 7,575,014 B2 * | 8/2009 | Stelzer .................. B64D 33/02 137/15.1 |
| 7,600,713 B2 | 10/2009 | Hein et al. |
| 7,625,173 B2 | 12/2009 | Mehring |
| 2006/0218934 A1 | 10/2006 | Williams et al. |
| 2009/0019823 A1 | 1/2009 | Juliar et al. |

* cited by examiner

INLET DUCT SCREEN ASSEMBLY

CROSS-REFERENCE TO RELATED APPLICATIONS

This application is a divisional of U.S. patent application Ser. No. 13/193,673 filed on 29 Jul. 2011. Application Ser. No. 13/193,673 claims priority to U.S. Provisional Patent Application No. 61/486,502 filed on 16 May 2011. Application Ser. No. 13/193,673 and Application No. 61/486,502 are each incorporated herein by reference.

BACKGROUND

This disclosure relates to an inlet duct screen for an aircraft auxiliary power unit assembly.

An auxiliary power unit (APU) is commonly used in aircraft to provide power for various aircraft systems. The APU is typically mounted to structural members within a tail cone of the aircraft. Aircraft skin is secured to the structural members, such as the airframe, to enclose the APU.

An inlet duct is typically integral with an aircraft skin. The inlet duct extends from the APU to an inlet duct opening near the aircraft skin. Air communicates to the APU through the inlet duct. An inlet duct screen covers the inlet duct opening to block debris and other foreign objects from entering the inlet duct. The inlet duct screen is visible from the exterior of the aircraft. It is desirable for the inlet duct screen to be mounted flush with the aircraft skin to reduce drag on the aircraft and improve aesthetics.

SUMMARY

An example aircraft auxiliary power unit assembly includes an auxiliary power unit configured to be arranged within a cavity established by an aircraft skin, and an inlet duct configured to be secured within an opening of the aircraft skin. The inlet duct configured to communicate a flow of air to an inlet housing of the auxiliary power unit. An inlet duct screen is secured relative to the inlet duct. The inlet duct screen is machined from a single sheet of material.

An example inlet duct screen assembly includes a grid portion includes a plurality of apertures and a frame portion circumscribing the grid portion. The grid portion and the frame portion are formed from a single sheet of material.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
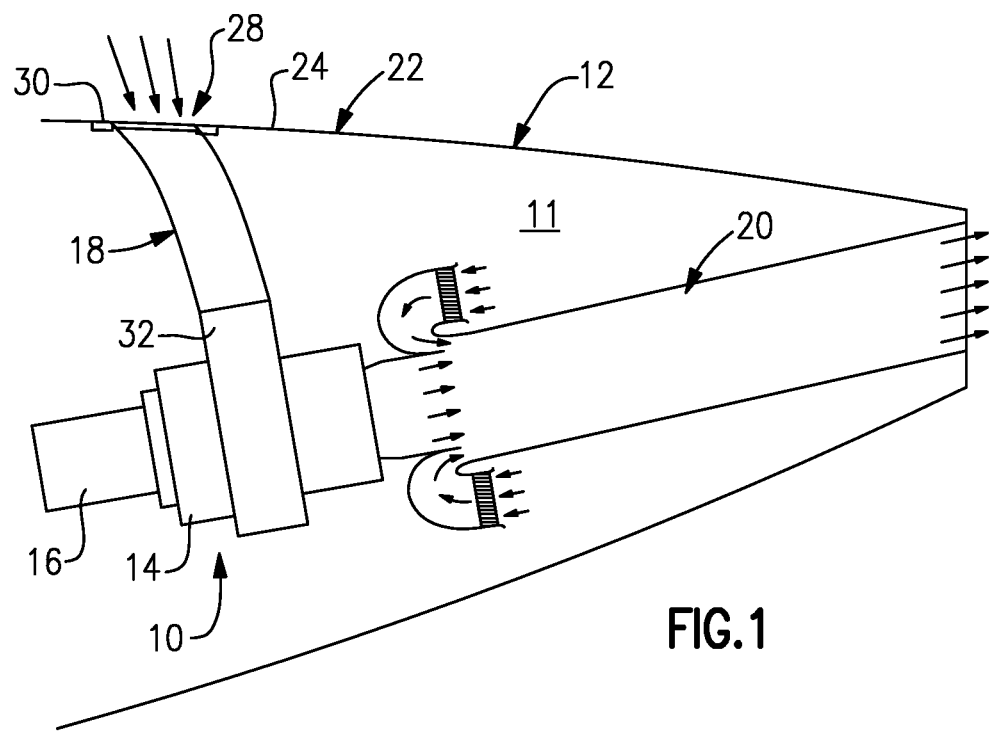
FIG. 1 is a schematic view of an APU arranged within a tail cone.
Figure 2:
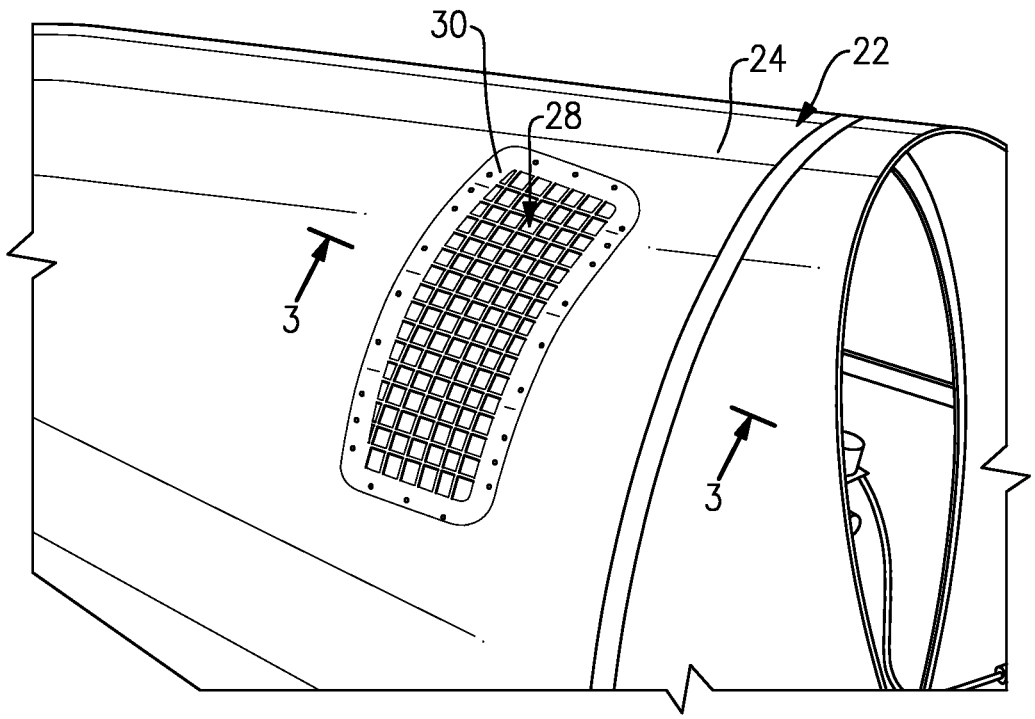
FIG. 2 is a perspective view of an example inlet duct screen secured relative to an aircraft skin and covering an inlet duct of the FIG. 1 APU.
Figure 3:
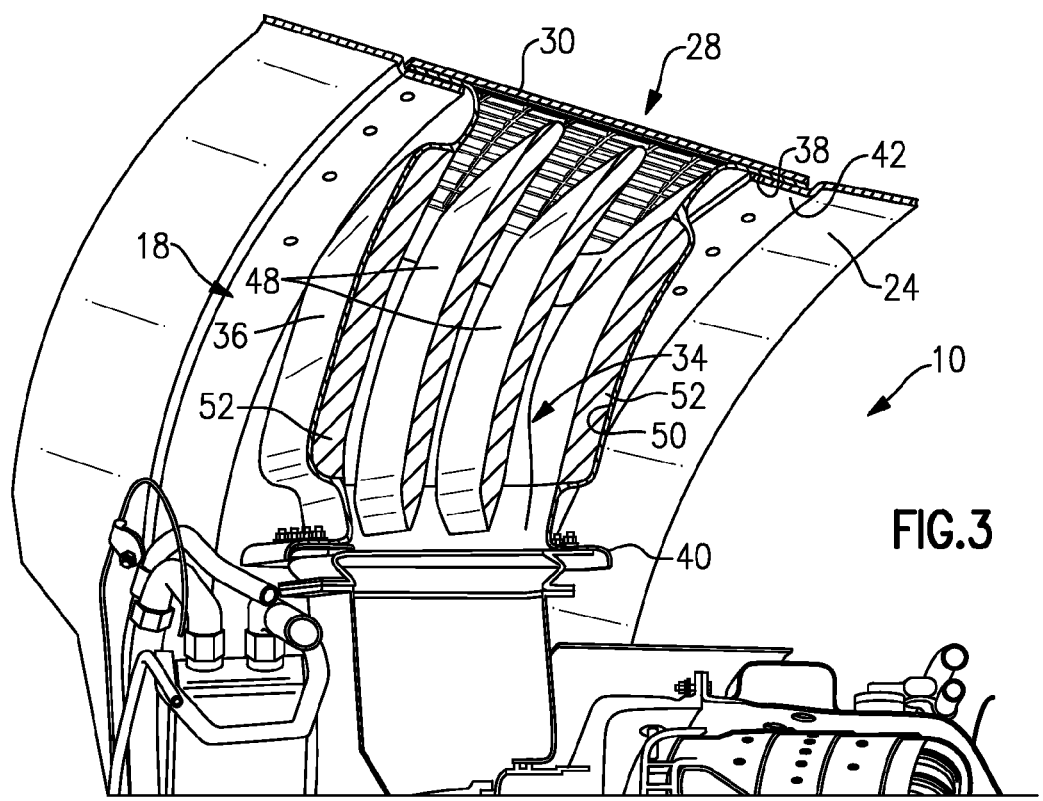
FIG. 3 is a section view at line 3-3 in FIG. 2.

Referring to FIGS. 1-3, an auxiliary power unit (APU) 10 is shown arranged in a cavity 11 of a tail cone 12. The APU 10 includes a gearbox 14 through which a generator 16 is mechanically driven in response to rotation of a shaft-mounted compressor and turbine (not shown). Air from the exterior of the tail cone 12 is supplied through an inlet duct 18 to the compressor. The compressed air from the compressor is expanded across the turbine, and expelled through an exhaust duct 20.

An outer surface 22 of an aircraft skin 24 faces away from the cavity 11. The outer surface 22 provides an aerodynamic outer mold line or contour of the tail cone 12. The inlet duct 18 is secured to the skin 24 in this example.

Air enters the inlet duct 18 through an opening 28. An inlet duct screen assembly 30 covers the opening 28. That is, air entering the opening 28 moves through the inlet duct screen 30. The inlet duct screen 30 discourages debris and other foreign objects from entering the inlet duct 18.

The APU 10 includes an inlet housing 32 that is sealed to the inlet duct 18. The inlet duct 18 defines a passage 34 provided by a neck 36. First and second duct flanges 38 and 40 are arranged on opposite ends of the neck 36. The first duct flange 38 is secured to a skin flange 42 provided by the skin 24. In the example, the skin flange 42 is recessed from the adjoining outer surface 22. The second duct flange 40 secures the inlet duct 18 to (or near) the inlet housing 32.

The example inlet duct 18 is configured to reduce inlet noise during operation of the APU 10. The body of the inlet duct 18 may be constructed from a fiberglass with a phenolic resin or carbon fiber composite, for example.

A first silencing element 48, in the example, two silencing elements, is arranged within the passage 34 and extends between inner walls 50 of the neck 36 and opposite ends of the inlet duct 18. A second silencing element 52 is secured directly to the inner walls 50. In one example, the first and second silencing elements 48 and 52 include a sound-deadening structure constructed from an aluminum honeycomb to which a porous mesh is adhered with resin.

Figure 4:
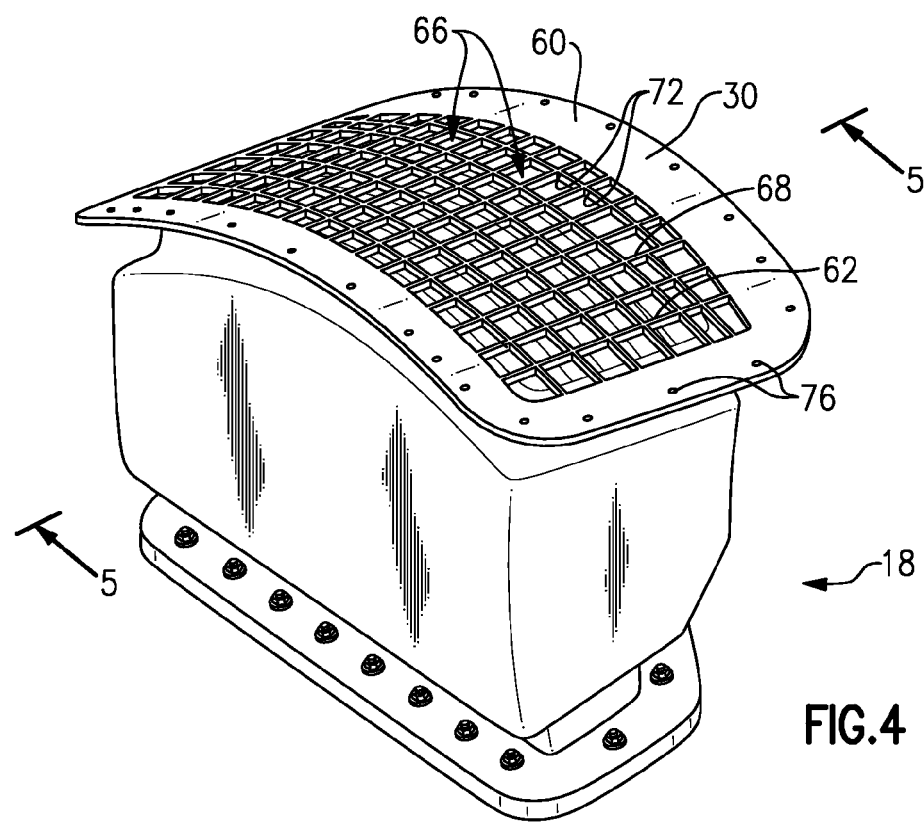
FIG. 4 is a perspective view of the FIG. 2 inlet duct screen and inlet duct.
Figure 5:
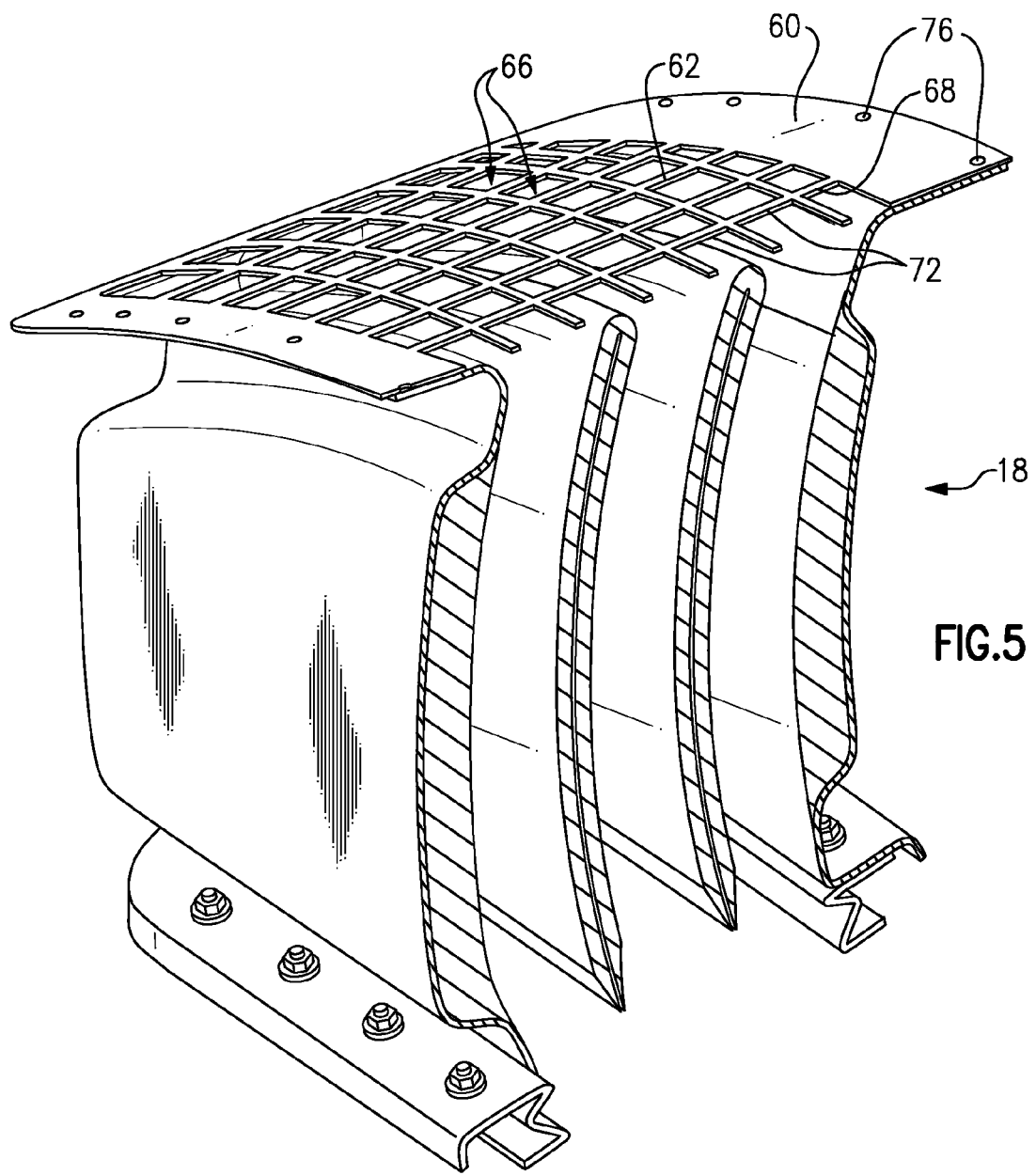
FIG. 5 is a section view at line 5-5 in FIG. 4.
Figure 6:
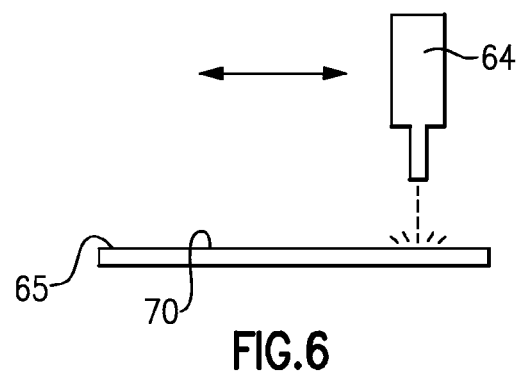
FIG. 6 shows a machining of a sheet of material to form the example inlet duct screen.

Referring now to FIGS. 4-6 with continuing reference to FIGS. 1-3, the example inlet duct screen assembly 30 is a separate structure from the inlet duct 18. The inlet duct screen 30 includes a frame portion 60 circumscribing a grid portion 62.

The frame portion 60 and the grid portion 62 are machined from a single sheet of material. For example, a water jet cutter 64 may direct a high-pressure stream of water at a sheet of material 65 to cut the frame portion 60 and the grid portion 62. Notably, the water jet process does not leave a recast layer that can cause cracks.

The example inlet duct screen 30 is formed from the sheet of metallic material 65. However, it should be understood that any suitable material may be used, for example, metallic, non-metallic materials, or both.

Machining the grid portion 62 facilitates establishing differently sized apertures 66 within the grid portion 62. Grid segments 68 form the boundaries of the apertures 66.

The apertures 66 are rectangular in this example. The sizes, shapes, and locations of the individual apertures 66 can be adjusted by changing how the grid portion 62 is machined. The grid portion 62 can thus be optimized for airflow into the apertures 66, to lessen ice build-up, to enhance aesthetics, etc.

The sizes and profiles of the individual apertures 66 within the grid portion 62 may vary. That is, some of the apertures 66 in the grid portion 62 may be larger than other apertures 66 of the grid portion 62. Apertures 66 having different sizes may be used to encourage flow through certain areas of the grid portion 62 rather than other areas, for example.

Some of the apertures 66 near the perimeter of the grid portion 62 are smaller than the apertures near the center of the grid portion 62. The apertures 66 near the perimeter are smaller so that the grid portion 62 does not extend beyond the edges of the opening 30. In this example, the grid portion 62 is the same size as the opening 28. Other examples may include grid portions 62 and apertures 66 of different sizes. Adjustments to the sizes and placement of the apertures 66 can be relatively easily made because the apertures 66 are machined from the single sheet of material.

Notably, the grid segments 68 of the grid portion 62 may not be aligned relative to each other. For example, as shown in FIG. 5, a circumferentially extending grid segment defining the perimeter of one of the apertures 66 may be axially offset from a circumferentially extending grid segment defining the perimeter of an adjacent one of the apertures 66. Misaligning the grid segments 68 may be required to ensure that the aperture 66 defined by those grid segments 68 is sufficiently sized for machining operations. Adjustments to the sizes and placement of the grid segments 68 within the grid portion 62 can be relatively easily made because the apertures 66 are machined from the single sheet of material.

In this example, the path followed by the water jet cutter 64 is adjusted to cut the grid portion 62. The thickness of the grid segments 68 in this example is between 0.063 inch (1.6 millimeters) and 0.40 inch (10.2 millimeters), and most of the apertures 66 are about 0.40 inch (10.2 millimeters) tall and about 0.40 inch (10.2 millimeters) wide. The sizes of the apertures 66 typically ranges from 0.25-1.0 inch (6.35-25.4 millimeters) tall and 0.25-1.0 inch (6.35-25.4 millimeters) wide.

Since the example grid segments 68 are established by a stream of water extending generally perpendicular to an outerwardly facing surface 70 of the sheet of material 65, inner edges 72 of the grid segments 68 are generally perpendicular to the outwardly facing surface 70. The grid segments 68 thus have a rectangular, and in this example, a nearly square cross-sectional profile.

The inlet duct screen 30 generally lies within the contour provided by the outer surface 22 in an installed position, as illustrated in FIG. 3. The curvature of the inlet duct screen 30 may be adjusted before or after the machining of the frame portion 60 and the grid portion 62. Roll forming processes or stamping processes are used to establish the curvature of the inlet duct screen 30, for example.

The thickness of the example inlet duct screen 30 depends on the thickness of the sheet of material 65. Although the example inlet duct screen 30 is in line with the outer surface 22. Other examples may include adjusting the thickness of the inlet duct screen 30 to make the inlet duct screen 30 proud relative to the outer surface 22.

Apertures 76 extend through the frame portion 60. The water jet cutter 64 may cut the apertures 76. Fastening elements (not shown) are received in the apertures 76 to secure the inlet duct screen 30 relative to the inlet duct 18 and the skin flange 42. The fastening elements may be a flat machine screw and nut, for example.

The outermost structure (in the example, the frame portion 60) may include chamfers circumscribing each aperture 76 to accommodate a countersunk head of a fastening element and provide a more aerodynamic surface.

Features of the disclosed examples include an inlet duct screen formed by a process that allows relatively easy adjustments to the dimensions of the inlet screen during manufacturing compared to prior art wire mesh screens having woven wires and inconsistent thicknesses.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An aircraft auxiliary power unit assembly comprising:
an auxiliary power unit configured to be arranged within a cavity established by an aircraft skin;
an inlet duct configured to be secured within an opening of the aircraft skin, the inlet duct configured to communicate a flow of air to an inlet housing of the auxiliary power unit; and
an inlet duct screen secured relative to the inlet duct, the inlet duct screen machined from a single sheet of material,
wherein the inlet duct screen comprises a grid portion with a plurality of apertures that extend uninterruptedly from an outwardly facing surface of the sheet of material to an inwardly facing surface of the sheet of material,
wherein a circumferentially extending grid segment defining a perimeter of one of the apertures is axially offset from a circumferentially extending grid segment defining another one of the apertures.

2. The assembly of claim 1, wherein the aircraft skin has an outer surface on an exterior side opposite the cavity.

3. The assembly of claim 2, the outer surface includes a contour and the inlet duct screen is generally arranged along the contour.

4. The assembly of claim 1, wherein the inlet duct includes a passage and the inlet duct screen is arranged over the passage.

5. The assembly of claim 1, wherein the plurality of apertures each have a consistent cross-sectional diameter from the outwardly facing surface to the inwardly facing surface.

6. The assembly of claim 1, wherein the apertures are each provided by a plurality of inner edges that are generally perpendicular to an outwardly facing surface of the inlet duct screen.

7. The assembly of claim 1, wherein the inlet duct screen including a frame portion circumscribing a grid portion, the frame portion having apertures configured to receive fastening elements.

8. An aircraft auxiliary power unit assembly comprising:
an auxiliary power unit configured to be arranged within a cavity established by an aircraft skin;
an inlet duct configured to be secured within an opening of the aircraft skin, the inlet duct configured to communicate a flow of air to an inlet housing of the auxiliary power unit; and
an inlet duct screen secured relative to the inlet duct, the inlet duct screen machined from a single sheet of material, wherein apertures near a perimeter of the grid portion have a smaller cross-section than apertures near a center of the grid portion.

9. An inlet duct screen assembly, comprising:
a grid portion including a plurality of apertures;
a frame portion circumscribing a grid portion, wherein the grid portion and the frame portion are formed from a single sheet of material,
wherein apertures near a perimeter of the grid portion have a smaller cross-section than apertures near a center of the grid portion.

10. The inlet duct screen assembly of claim 9, wherein the grid portion includes grid segments having a rectangular cross-section.

11. The inlet duct screen assembly of claim 9, wherein the single sheet of material is a metallic material.

12. The inlet duct screen assembly of claim 9, wherein the grid portion is nonwoven.

13. The inlet duct screen assembly of claim 9, wherein the grid portion and the frame portion together establish a monolithic inlet duct screen.

14. The inlet duct screen assembly of claim 9, wherein the apertures are rectangular.

15. The inlet duct screen assembly of claim 9, wherein plurality of apertures each extend uninterruptedly from an outwardly facing surface of the sheet of material to an inwardly facing surface of the sheet of material.

16. The inlet duct screen assembly of claim 9, wherein the plurality of apertures each have a consistent cross-sectional diameter from an outwardly facing surface of the sheet of material to the inwardly facing surface of the sheet of material.

17. The inlet duct screen assembly of claim 9, wherein the frame portion includes apertures configured to receive fastening elements.

18. An inlet duct screen assembly, comprising:
a grid portion including a plurality of apertures; and
a frame portion circumscribing a grid portion, wherein the grid portion and the frame portion are formed from a single sheet of material, wherein a circumferentially extending grid segment defining a perimeter of one of the apertures is axially offset from a circumferentially extending grid segment defining another one of the apertures.

* * * * *